United States Patent
Kwon et al.

(10) Patent No.: US 10,279,320 B2
(45) Date of Patent: May 7, 2019

(54) WATER-TREATMENT SEPARATION MEMBRANE COMPRISING IONIC EXCHANGEABLE POLYMER LAYER AND METHOD FOR FORMING SAME

(71) Applicant: LG CHEM, LTD., Seoul (KR)

(72) Inventors: Hyejin Kwon, Daejeon (KR); Seungpyo Jeong, Daejeon (KR); Taehyeong Kim, Daejeon (KR); Joong Jin Han, Daejeon (KR); Chong Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 340 days.

(21) Appl. No.: 15/021,847

(22) PCT Filed: Sep. 16, 2014

(86) PCT No.: PCT/KR2014/008621
§ 371 (c)(1),
(2) Date: Mar. 14, 2016

(87) PCT Pub. No.: WO2015/037967
PCT Pub. Date: Mar. 19, 2015

(65) Prior Publication Data
US 2016/0220968 A1 Aug. 4, 2016

(30) Foreign Application Priority Data
Sep. 16, 2013 (KR) .................. 10-2013-0110865
Sep. 16, 2014 (KR) .................. 10-2014-0122785

(51) Int. Cl.
| | | |
|---|---|---|
| *C08J 5/22* | (2006.01) | |
| *B01D 61/02* | (2006.01) | |
| *B01D 61/14* | (2006.01) | |
| *B01D 69/02* | (2006.01) | |
| *B01D 69/10* | (2006.01) | |
| *B01D 69/12* | (2006.01) | |
| *B01D 71/28* | (2006.01) | |
| *B01D 71/32* | (2006.01) | |
| *B01D 71/52* | (2006.01) | |
| *B01D 71/76* | (2006.01) | |
| *B01D 71/80* | (2006.01) | |
| *B01D 71/82* | (2006.01) | |

(52) U.S. Cl.
CPC ............ *B01D 71/82* (2013.01); *B01D 69/02* (2013.01); *B01D 69/10* (2013.01); *B01D 69/12* (2013.01); *B01D 71/28* (2013.01); *B01D 71/32* (2013.01); *B01D 71/52* (2013.01); *B01D 71/76* (2013.01); *B01D 71/80* (2013.01); *C08J 5/2256* (2013.01); *B01D 61/025* (2013.01); *B01D 61/027* (2013.01); *B01D 61/145* (2013.01); *B01D 2323/02* (2013.01); *B01D 2323/04* (2013.01); *B01D 2323/12* (2013.01)

(58) Field of Classification Search
CPC .. B01D 61/025; B01D 61/027; B01D 61/142; B01D 69/02; B01D 69/10; B01D 69/12; B01D 71/28; B01D 71/32; B01D 71/52; B01D 71/7882; C08J 5/2256
See application file for complete search history.

(56) References Cited

U.S. PATENT DOCUMENTS

| | | | |
|---|---|---|---|
| 7,258,941 B2 | 8/2007 | Hirano et al. | |
| 2007/0163951 A1* | 7/2007 | McGrath | B01D 61/025 210/500.41 |
| 2009/0234032 A1* | 9/2009 | Kimishima | B01D 67/009 521/27 |
| 2009/0325028 A1 | 12/2009 | Yamashita et al. | |
| 2011/0065021 A1 | 3/2011 | Kitamura et al. | |
| 2011/0311899 A1* | 12/2011 | Onodera | C08G 61/12 429/482 |
| 2012/0083541 A1* | 4/2012 | Khvorost | C08G 75/23 521/27 |
| 2012/0142790 A1 | 6/2012 | Hwang et al. | |
| 2013/0248441 A1* | 9/2013 | Lee | B01D 69/08 210/500.23 |
| 2014/0311969 A1* | 10/2014 | Ko | B01D 69/02 210/500.38 |

FOREIGN PATENT DOCUMENTS

| | | | |
|---|---|---|---|
| CN | 101340002 A | 1/2009 | |
| EP | 1394879 A1 * | 3/2004 | ............ H01B 1/122 |
| JP | S63258603 A | 10/1988 | |
| JP | S649230 A | 1/1989 | |
| JP | 2000102785 A | 4/2000 | |
| JP | 2008520403 A | 6/2008 | |
| JP | 2012519593 A | 8/2012 | |
| KR | 1020120044973 A | 5/2012 | |
| KR | 1020120060645 A | 6/2012 | |
| WO | 2006034575 A1 | 4/2006 | |
| WO | 2006065068 A1 | 6/2006 | |

* cited by examiner

*Primary Examiner* — James C Goloboy
(74) *Attorney, Agent, or Firm* — Dentons US LLP

(57) ABSTRACT

The present invention relates to a water treatment membrane including a support; and a polymer layer including a copolymer containing a hydrophobic repeating unit and a hydrophilic repeating unit including an ion exchange functional group on the support, wherein the polymer layer has ion exchange capacity (IEC) of 0.02 meq/g to 2.4 meq/g, and to a water treatment module, which have excellent salt rejection and permeate flow properties.

12 Claims, No Drawings

WATER-TREATMENT SEPARATION MEMBRANE COMPRISING IONIC EXCHANGEABLE POLYMER LAYER AND METHOD FOR FORMING SAME

TECHNICAL FIELD

The present disclosure relates to a water treatment membrane and a method for manufacturing the same, and in particular, to a water treatment membrane improving a permeate flow property by forming a polymer layer containing an ion exchange functional group, and a method for manufacturing the same.

BACKGROUND ART

Developing a new source of water resources has surfaced as an urgent facing problem due to recent serious pollution of water quality environments and water shortage. Researches on the pollution of water quality environments aim for high-quality residential and industrial water, and treatment of various domestic sewage and industrial wastewater, and interests in water treatment processes using a separation membrane having an advantage of energy saving has been rising. In addition, accelerated reinforcement on environment regulations is expected to advance wide utilization of separation membrane technologies. Traditional water treatment processes are difficult to satisfy the tightened regulations, however, separation membrane technologies secure excellent treatment efficiency and stable treatment, therefore are expected to become a leading technology in the field of water treatment in the future.

Liquid separation is divided into microfiltration, ultrafiltration, nanofiltration, reverse osmosis, stannizing, active transport, electrodialysis, and the like, depending on the pore of the membrane.

Water treatment membranes that have been developed so far are generally manufactured using a method of forming a support layer and/or an active layer and the like on a support such as nonwoven fabric using a polymer material. Herein, examples of the polymer material include polysulfone, polyethersulfone, polycarbonate, polyethylene oxide, polyimide, polyetherimide, polyetheretherketone, polypropylene, polymethylpentene, polymethyl chloride, polyvinylidene fluoride and the like, and among these, polysulfone is particularly frequently used.

The polymer materials have excellent separation efficiency and favorable mechanical strength but have a hydrophobic property, and therefore, have a limit in improving permeate flow.

Accordingly, development of new polymer materials capable of improving the permeate flow of a water treatment membrane has been required.

DISCLOSURE

Technical Problem

In view of the above, an object of the present invention is to provide a water treatment membrane increasing permeate flow while having excellent salt rejection, and a method for manufacturing the same.

Technical Solution

According to one embodiment of the present invention, the present invention provides a water treatment membrane including a support; and a polymer layer including a copolymer containing a hydrophobic repeating unit and a hydrophilic repeating unit including an ion exchange functional group on the support, wherein the polymer layer has ion exchange capacity (IEC) of 0.02 meq/g to 2.4 meq/g.

Herein, the ion exchange functional group is preferably any one or more selected from the group consisting of —$SO_3M$, —$CO_3M$ and —$PO_3M$ (herein, M is H, Na or K).

A molar ratio of the hydrophilic repeating unit and the hydrophobic repeating unit is preferably 1:9 to 1:1.

In addition, the polymer layer may have a thickness of 0.1 μm to 200 μm.

Furthermore, the water treatment membrane preferably has initial salt rejection of 97% or greater, and initial permeate flow of 38 to 48 gallon/$ft^2$·day when a sodium chloride (NaCl) solution having a concentration of 32,000 ppm passes therethrough under a pressure of 800 psi.

Meanwhile, according to another embodiment of the present invention, the present invention provides a water treatment module including the water treatment membrane.

In addition, according to still another embodiment of the present invention, the present invention provides a method for manufacturing a water treatment membrane including coating a support using a solution including a copolymer containing a hydrophobic repeating unit and a hydrophilic repeating unit including an ion exchange functional group, and a solvent; and carrying out phase transition by immersing the coated support in a non-solvent.

Advantageous Effects

A water treatment membrane according to the present invention includes a polymer layer including a copolymer containing a hydrophobic repeating unit and a hydrophilic repeating unit including an ion exchange functional group on a support, and as a result, a water treatment membrane significantly increasing permeate flow while having excellent salt rejection compared to existing water treatment membranes may be provided.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As described above, polysulfone-based polymers used as an active layer and/or a support layer in existing water treatment membranes have excellent mechanical strength and separation efficiency, however, have a limit in enhancing permeate flow due to hydrophobicity. As a result of extensive studies for developing a water treatment membrane capable of enhancing permeate flow while having excellent salt rejection and mechanical strength, the inventors of the present invention have found that such an object may be accomplished by forming an ion-exchangeable polymer layer having specific ion exchange capacity on a support when manufacturing a water treatment membrane, and completed the present invention.

More specifically, a water treatment membrane according to the present invention includes a support; and a polymer layer including a copolymer containing a hydrophobic repeating unit and a hydrophilic repeating unit including an ion exchange functional group on the support, wherein the polymer layer has ion exchange capacity (IEC) of 0.02 meq/g to 2.4 meq/g.

Herein, as the support, those well known in the art may be used without limit, and examples thereof may include nonwoven fabric. Herein, examples of the nonwoven fabric material may include polyester, polycarbonate, finely porous polypropylene, polyphenylene ether, polyvinylidene fluoride and the like, but are not limited thereto.

Next, the polymer layer is an ion-exchangeable polymer layer, and preferably includes a copolymer containing a hydrophobic repeating unit and a hydrophilic repeating unit including an ion exchange functional group. The ion exchange functional group in the present invention is defined as an ionic group providing a transferable counter ion for ion conduction.

When the polymer layer having an ion exchange functional group is formed on the support, permeate flow increases by increasing the hydrophilicity of the polymer layer due to the ion exchange functional group.

Meanwhile, the ion exchange functional group capable of being used in the present invention may be any one or more selected from the group consisting of —$SO_3M$, —$CO_3M$ and —$PO_3M$ (herein, M is H, Na or K). More specifically, the ion exchange functional group may include —$SO_3H$, —$SO_3Na$, —$SO_3K$, —$CO_2H$, —$CO_2Na$, —$CO_2K$, —$PO_3H$, —$PO_3Na$ or —$PO_3K$, and particularly preferably —$SO_3H$ or —$SO_3Na$.

Meanwhile, the ion exchange capacity (IEC) represents ionic equivalents that 1 g of an ion exchange resin or a polymer compound is capable of exchanging, and may be calculated as the number of moles of an ion exchange functional group included per 1 g of a copolymer×ionic valency in the present invention.

The unit of ion exchange capacity is represented by meq/g, and the ion exchange capacity having a high value means having a high ion exchange ability, and as the ion exchange capacity increases, hydrophilicity of the polymer compound and the polymer layer increases.

Meanwhile, the polymer layer of the present invention preferably has ion exchange capacity of approximately 0.02 meq/g to 2.4 meq/g, and more preferably approximately 0.02 meq/g to 2.0 meq/g. When the ion exchange capacity is less than 0.02 meq/g, hydrophilicity of the polymer layer decreases, which causes a concern of permeate flow decrease when the polymer layer is manufactured to a separation membrane. Meanwhile, when the ion exchange capacity is greater than 2.4 meq/g, hydrophilicity of the copolymer excessively increases, which leads to unnecessary increase in solubility for water causing a concern of durability decrease in the separation membrane, and salt rejection and permeate flow may all greatly decrease.

Meanwhile, the copolymer preferably includes the hydrophilic repeating unit and the hydrophobic repeating unit in a molar ratio of approximately 1:9 to 1:1, and more preferably in a molar ratio of approximately 1:5 to 1:1. When the mixing ratio of the hydrophilic repeating unit and the hydrophobic repeating unit satisfies the above range, a water treatment membrane having excellent permeate flow and durability may be manufactured. When the hydrophilic repeating unit is included in small amounts, permeate flow may be low, and when the hydrophilic repeating unit is included in excess, phase transition may not be smoothly achieved when forming the polymer layer.

Herein, the hydrophilic repeating unit including an ion exchange functional group may have a structure represented by the following Chemical Formula 1, and the hydrophobic repeating unit may have a structure represented by the following Chemical Formula 2.

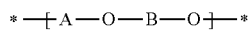

[Chemical Formula 1]

In [Chemical Formula 1], A and B are any one or more selected from the group consisting of the following functional groups, and may be repeatedly or crossly selected,

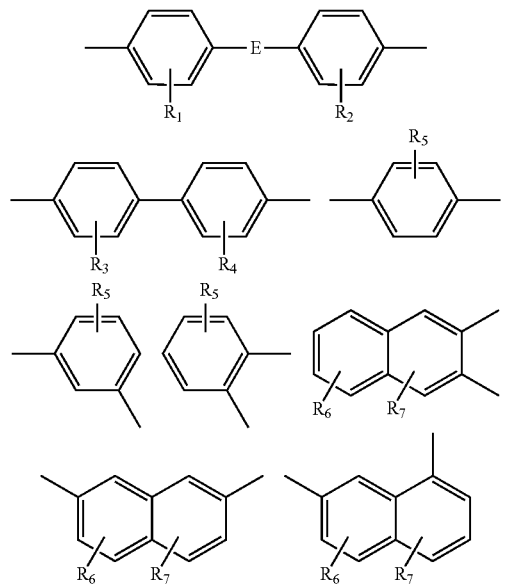

E is any one or more selected from the group consisting of the following functional groups, and

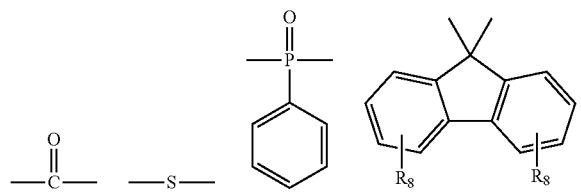

$R_1$ to $R_8$ are each independently hydrogen or an ion exchange functional group, and more specifically, any one of $R_1$ to $R_8$ in A or B may be —$SO_3M$, —$CO_3M$ or —$PO_3M$ (herein, M is H, Na or K).

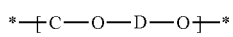

[Chemical Formula 2]

In [Chemical Formula 2], C and D are any one or more selected from the group consisting of the following functional groups, and may be repeatedly or crossly selected,

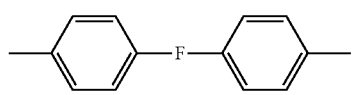

-continued

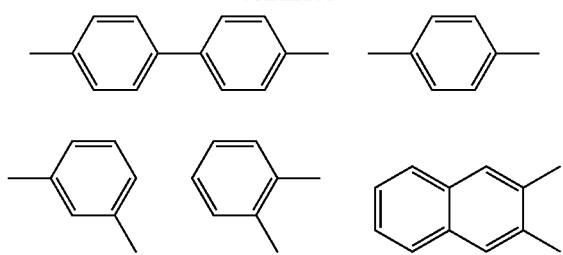

F is any one or more selected from the group consisting of the following functional groups, and

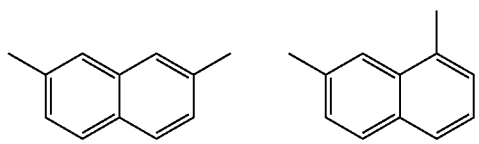

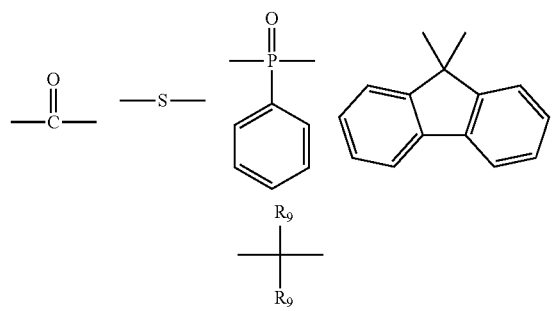

$R_9$ is hydrogen, methyl, —$CF_3$ or phenyl.

In addition, the hydrophilic repeating unit may preferably have a structure represented by the following Chemical Formula 3, and the hydrophobic repeating unit may have a structure represented by the following Chemical Formula 4.

[Chemical Formula 3]

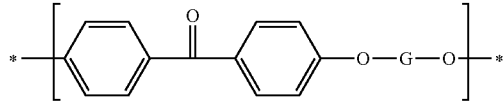

In [Chemical Formula 3], G is any one or more selected from the group consisting of the following functional groups, and

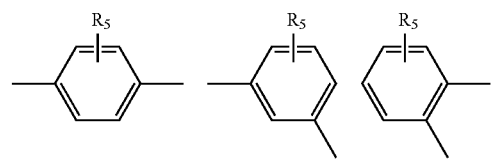

$R_5$ has an ion exchange functional group that is $SO_3M$, —$CO_3M$ or —$PO_3M$ (herein, M is H, Na or K).

[Chemical Formula 4]

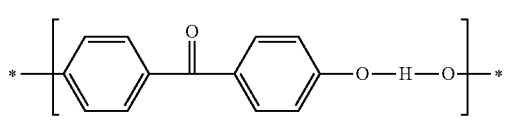

In [Chemical Formula 4], H is any one or more selected from the group consisting of the following functional groups.

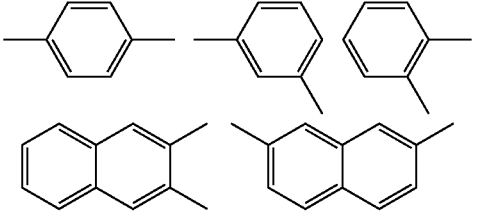

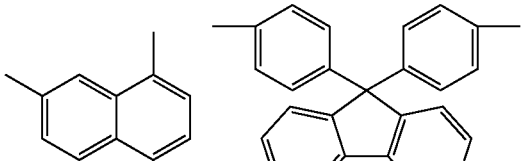

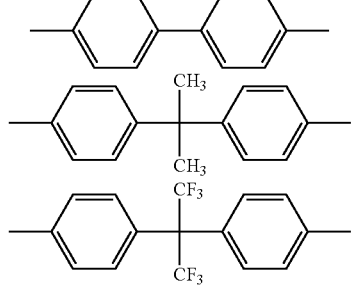

More preferably, the copolymer according to the examples of the present invention may include

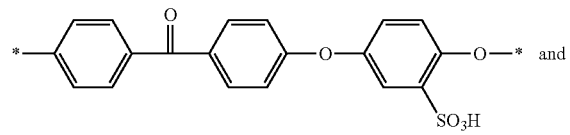

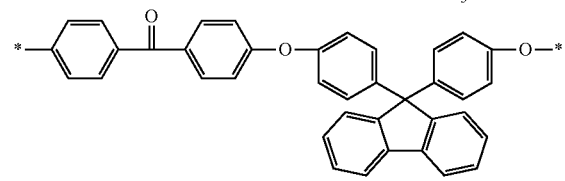

units.

In addition, * in Chemical Formulae 1 to 4 means a site in which repeating units are connected, and no separate atoms or molecules are present at the site.

Meanwhile, the weight average molecular weight of a copolymer including the repeating unit is preferably approximately 30,000 to 1,000,000. When the weight average molecular weight is less than 30,000, there is a concern that the durability of a water treatment membrane may decrease, and when the weight average molecular weight is greater than 1,000,000, there is a concern that solvent choice may become difficult.

More specifically, the copolymer containing a hydrophilic repeating unit including an ion exchange functional group is formed using an aromatic compound including an ion exchange functional group, as shown in Chemical Formula 1.

Examples of the aromatic compound including an ion exchange functional group capable of being used in the present invention may include a bisphenol-based monomer or an aromatic dihalogen-based monomer having one or more sulfonic acid groups or sulfonate groups substituted at the benzene ring, and specific examples thereof may include hydroquinonesulfonic acid potassium salt, 2,7-dihydroxynaphthalene-3,6-disulfonic acid disodium salt, 1,7-dihydroxynaphthalene-3-sulfonic acid monosodium salt, 2,3-dihydroxynaphthalene-6-sulfonic acid monosodium salt, potassium 5,5'-carnobylbis(2-fluorobenzene sulfonate) and potassium 2,2'-[9,9-bis(4-hydroxyphenyl)fluorene]sulfonate and the like, and among these, one or a mixture of two or more types may be used. Each of the compounds listed above may be obtained through general routes in the art or prepared using common methods. For example, the potassium 5,5'-carnobylbis(2-fluorobenzene sulfonate) may be prepared by direct sulfonation of 4,4'-difluorobenzophenone and 4,4'-difluorodiphenyl sulfone using fuming sulfuric acid, and the potassium 2,2'-[9,9-bis(4-hydroxyphenyl)fluorene]sulfonate may be prepared by direct sulfonation of 9,9-bis(4-hydroxyphenyl) fluorene using chlorosulfonic acid ($ClHSO_3$).

Meanwhile, the copolymer includes a hydrophobic repeating unit as shown in Chemical Formula 2, and, unlike the hydrophilic repeating unit, may be formed using an aromatic compound that does not include an ion exchange functional group. Specifically, 9,9-bis(4-hydroxyphenyl) fluorene and the like may be used.

In addition, the copolymer of the present invention may include an aromatic-based compound or a brancher, and herein, the brancher means a compound capable of forming a main chain of the copolymer of the present invention. Herein, specific types of the aromatic-based compound or the brancher are not particularly limited. Examples of the aromatic-based compound may include a bisphenol-based monomer or an aromatic dihalogen-based monomer, and specifically may include one, or a mixture of two or more types of 4,4'-difluorobenzophenone, bis(4-fluorophenyl)sulfone, 2,2-bis(4-hydroxyphenyl)propane, 2,2-bis(4-hydroxyphenyl)hexafluoropropane and 4,4-biphenol, however, the aromatic-based compound is not limited thereto.

Meanwhile, the thickness of the polymer layer formed on such a support in a water treatment membrane is preferably approximately 0.1 µm to 200 µm, and more preferably approximately 20 µm to 100 µm. When the thickness is less than 0.1 µm, mechanical strength is reduced causing a concern of durability reduction of the separation membrane, and when the thickness is greater than 200 µm, there is a concern of permeate flow decrease.

Meanwhile, the polymer layer formed on the support of the present invention may play a role of a support layer, and may be used as a two-layered water treatment membrane formed with the support and the polymer layer. Moreover, the polymer layer formed on the support of the present invention may be used as a water treatment membrane having a structure of three layers or more by additionally forming an active layer on the polymer layer as necessary.

For example, when the water treatment membrane is used as a reverse osmosis membrane, a polyamide layer may be formed as the active layer. Herein, the polyamide layer may be formed by interfacial polymerization of an amine compound and an acyl halide compound, and herein, the examples of the amine compound are preferably, but not limited to, m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or a mixture thereof. In addition, the acyl halide compound is an aromatic compound having 2 to 3 carboxylic acid halides, and examples thereof are preferably, but not limited to, trimesoyl chloride, isophthaloyl chloride, terephthaloyl chloride or a mixture thereof.

According to the test results carried out by the inventors of the present invention, it is seen that the separation membrane of the present invention described above including a polymer layer that includes a copolymer containing a hydrophobic repeating unit and a hydrophilic repeating unit including an ion exchange functional group, and that has ion exchange capacity (IEC) of 0.02 meq/g to 2.4 meq/g, significantly improves permeate flow while having excellent salt rejection compared to existing separation membranes, as shown in the following Table 2. More specifically, the separation membrane of the present invention has initial salt rejection of 97% or greater and initial permeate flow of approximately 38 to 48 gallon/ft$^2$·day, and preferably has initial salt rejection of 97.2% or higher and initial permeate flow of approximately 38 to 45 gallon/ft$^2$·day when a sodium chloride (NaCl) solution having a concentration of 32,000 ppm passes therethrough under a pressure of 800 psi.

Meanwhile, a water treatment membrane including the constituents described above may be used for a microfiltration membrane, an ultrafiltration membrane, a nanofiltration membrane, a reverse osmosis membrane or the like, and may be particularly preferably used for a reverse osmosis membrane.

In addition, the present invention relates to a water treatment module including at least one or more of the water treatment membranes according to the present invention described above.

Specific types of the water treatment module of the present invention are not particularly limited, and examples thereof include a plate & frame module, a tubular module, a hollow & fiber module, a spiral wound module or the like. In addition, the water treatment module of the present invention is not particularly limited in other constitutions and manufacturing methods as long as the water treatment module includes the water treatment membrane of the present invention described above, and general means known in the art may be employed without limit.

Next, a method for manufacturing the water treatment membrane of the present invention will be described.

More specifically, a method for manufacturing the water treatment membrane of the present invention includes (1) coating a support using a solution including a copolymer containing a hydrophobic repeating unit and a hydrophilic repeating unit including an ion exchange functional group, and a solvent; and (2) carrying out phase transition by immersing the coated support in a non-solvent.

First, in the operation of (1) coating a support using a solution including a copolymer containing a hydrophobic repeating unit and a hydrophilic repeating unit including an ion exchange functional group, and a solvent, the copolymer is the same as that described above, therefore, detailed descriptions will not be repeated.

Next, the types of the solvent are not particularly limited as long as the solvent is capable of dissolving a polymer compound including the copolymer of the present invention. As examples of the solvent, methyl acetate, hydrazine, trichloromethane, diiodomethane, trichloroethylene, styrene, 2-butanone, tetrahydrofuran, cyclohexanone, acetone, benzonitrile, isophorone, 2-ethyl-1-hexanol, dichloromethane, dibutyl phthalate, 1,4-dioxane, 1,2-dichlorobenzene, 1,2-dichloroethane, 2-butoxyethanol, 1-bromonaphthalene, acetic acid, epichlorohydrin, benzaldehyde, morpholine, acrylonitrile, acetophenone, pyridine, 2-butanol, cyclohexanol, aniline, 2-methylpropyl alcohol, 3-methylphenol, N-methyl-2-pyrrolidine, 1-butanol, bromine, 2-ethoxyethanol, phenoxyethanol, 2-propanol, benzyl alcohol, dimethylethanolamine, 2-furanmethanol, acetonitrile, 1-propanol, 2-methoxymethanol, methanoic acid, N,N-dimethylformamide, nitromethane, ethanol, dimethyl sulfoxide, propylene carbonate, 1,3-butanediol, diethylene glycol, methanol, 1,2-propanediol, 2-aminoethanol, ethylene glycol, ethylene carbonate, diethyl sulfate, nitroethane, allyl alcohol, γ-butyrolactone or the like may be used either alone or as a mixture.

Meanwhile, the method of forming the polymer layer on one surface of the support in the operation of (1) may be carried out using methods well known in the art, and the coating method is not particularly limited, and the coating may be carried out using contact methods well known in the art such as immersion, application and spray.

When the polymer layer is coated on one or both surfaces of the support using methods described above, the coated support is immersed in a non-solvent (operation of (2)). In other words, an exchange occurs between a non-solvent and a solvent including the copolymer, and as a result, a polymer-coated separation membrane is manufactured on the support using a method of extracting the solvent.

Examples of the non-solvent suitable for the present invention may include a pure liquid including distilled water that is distilled once, distilled water that is distilled three times, alcohols and the like, and a mixture thereof, but are not limited thereto.

In addition, in the operation of (2), the polymer layer is prepared using a phase transition phenomenon (Marcel Mulder, "Basic principles of membrane technology", Published by Kluwer Academic Publishers, Dordrecht, 1996). Specifically, when the support coated with the polymer layer is immersed in a coagulation bath filled with distilled water that is distilled three times, which is a non-solvent (non-solvent coagulation bath), the solvent in the solution that includes a polymer compound including the copolymer is coming out by being dissolved in the distilled water that is distilled three times, which is a non-solvent, however, the polymer compound is not coming out since it is not dissolved in the non-solvent, and as a result, a polymer phase and pores are formed.

In other words, the solution including a polymer compound of the coated support starts to coagulate by being immersed in a non-solvent coagulation bath, the solvent at the surface comes out by being dissolved in the non-solvent in the coagulation bath, and as a result, the viscosity of the surface solution significantly increases turning into a gel state. Herein, partial composition changes occur during the non-solvent penetrating into the polymer solution causing the reduction in the stability of the polymer solution, and as a result, phase transition by an exchange of the solvent and the non-solvent occurs on the surface and inside of the polymer layer due to thermodynamical instability.

Meanwhile, the method for manufacturing a water treatment membrane according to the present invention may further include forming an active layer on the polymer layer.

Hereinafter, the present invention will be described in more detail through more specific examples.

Preparation Examples 1 to 6

By the molar content described in the following Table 1, 4,4-difluorobenzophenone, hydroquinone sulfonic acid potassium salt, 9,9-bis(hydroxyphenyl)fluorene and potassium carbonate were first introduced to a 4-neck round flask (500 mL), and then dimethyl sulfoxide (hereinafter, DMSO) and benzene were introduced thereto. The result was stirred for 4 hours at 140° C. after installing a stirrer and a Dean-Stark trap in the flask.

After reacting for 4 hours, the result was reacted for 20 hours at 180° C. After the reaction was complete, the result was slowly cooled to room temperature. In order to remove DMSO, the flask including the synthesized polymer solution was slowly tilted, and deposits were caught in methanol. The deposited polymer was collected, washed several times with water, and then the washed polymer was heated, and dried using a vacuum pump to obtain a copolymer having an ion exchange functional group. The ion exchange capacity of the polymer layer including the obtained copolymer is as shown in the following Table 1.

Examples 1 to 5

A uniform liquid was obtained by placing the copolymer prepared in Preparation Examples 1 to 5 in an N,N-dimethylformamide (DMF) solution in 18% by weight with respect to the total solid content, and then dissolving the result for 12 hours or longer at 80° C. to 85° C. This solution was casted to a thickness of 45 to 50 μm on nonwoven fabric having a thickness of 95 to 100 μm and made of polyester. Next, a polymer layer was formed by placing the casted nonwoven fabric in water.

After that, the polymer layer was immersed in an aqueous solution including 2% by weight of meta-phenylenediamine, 1% by weight of triethylamine and 2.3% by weight of camphorsulfonic acid for 2 minutes, then the excess aqueous solution was removed using a 25 psi roller, and the result was dried for 1 minute at room temperature. Next, an interfacial polymerization reaction was carried out by applying an organic solution including 0.2% by volume of trimesoyl chloride (TMC) in a hexane solution (manufactured by Sigma Aldrich) on the surface of the coated separation membrane, and then the result was dried for 10 minutes in an oven at 60° C. in order to remove the excess organic solution. The water treatment membrane obtained using the method described above was immersed in 0.2% by weight of an aqueous sodium carbonate solution for 2 hours or longer, and then washed again with distilled water for 1 minute, and as a result, a water treatment membrane having a polyamide active layer was manufactured.

Comparative Example 1

A uniform liquid was obtained by placing 18% by weight of polysulfone solids in an N,N-dimethylformamide (DMF) solution in, and then dissolving the result for 12 hours or longer at 80° C. to 85° C. This solution was casted to a thickness of 45 to 50 μm on nonwoven fabric having a thickness of 95 to 100 μm and made of polyester. Next, a multiporous polysulfone support was prepared by placing the casted nonwoven fabric in water. After that, a polyamide active layer is formed in the same manner as in Example 1, and as a result, a water treatment membrane was manufactured.

Comparative Example 2

A polymer layer having ion exchange capacity of 2.5 meq/g was prepared according to Preparation Example 6, and then a polyamide active layer was formed in the same manner as in Example 1, and as a result, a water treatment membrane was manufactured.

TABLE 1

| Category | Preparation Example 1 | Preparation Example 2 | Preparation Example 3 | Preparation Example 4 | Preparation Example 5 | Preparation Example 6 |
|---|---|---|---|---|---|---|
| 4,4'-Difluorobenzophenone (mol) | 0.1 | 0.1 | 0.1 | 0.1 | 0.1 | 0.1 |
| Hydroquinone Sulfonic Acid Potassium Salt (mol) | 0.01 | 0.02 | 0.03 | 0.04 | 0.047 | 0.095 |
| 9,9-Bis(hydroxyphenyl)fluorene (mol) | 0.09 | 0.08 | 0.07 | 0.06 | 0.053 | 0.004 |
| Potassium Carbonate (mol) | 0.21 | 0.21 | 0.21 | 0.21 | 0.21 | 0.21 |
| Ion Exchange Capacity (meq/g) | 0.2 | 0.4 | 0.6 | 0.8 | 1.0 | 2.5 |

Test Example 1—Initial Salt Injection and Initial Permeate Flow Measurement

Initial salt rejection and initial permeate flow of the water treatment membrane manufactured in Examples 1 to 5 and Comparative Examples 1 and 2 were evaluated as follows. Initial salt rejection and initial permeate flow were each measured while supplying an aqueous sodium chloride solution having a concentration of 32,000 ppm with a flow rate of 4500 mL/min at 25° C. under a pressure of 800 psi. Water treatment membrane cell equipment used in the membrane evaluation was equipped with a flat-type permeation cell, a high pressure pump, a storage tank and cooling equipment, and the structure of the flat-type permeation cell was a cross-flow type and had a valid permeation area of 28 cm². After the washed water treatment membrane was installed in the permeation cell, sufficient preoperational tests were carried out for approximately 1 hour using distilled water that is distilled three times for evaluation equipment stabilization. Next, an equipment operation was carried out for approximately 1 hour after changing to an aqueous sodium chloride solution having a concentration of 32,000 ppm until pressure and permeate flow reached a stationary state, and flow was calculated by measuring the amount of water permeated for 10 minutes, and salt rejection was calculated by analyzing the salt concentration before and after permeation using a conductivity meter. The measurement results are shown in [Table 2].

TABLE 2

| Category | Salt Rejection (%) | Permeate Flow (GFD) |
|---|---|---|
| Example 1 | 97.2 | 38.0 |
| Example 2 | 97.8 | 40.0 |
| Example 3 | 98.0 | 44.9 |
| Example 4 | 97.9 | 43.3 |
| Example 5 | 97.5 | 41.8 |
| Comparative Example 1 | 97.1 | 35.1 |
| Comparative Example 2 | 90.5 | 32.7 |

As seen from the results in [Table 2], it was seen that, when the water treatment membrane included a polymer layer containing an ion exchange functional group as manufactured in Examples 1 to 5, salt rejection was improved, and at the same time, permeate flow was significantly improved compared to the existing water treatment membrane in Comparative Example 1 having a polysulfone support layer. In addition, when the ion exchange capacity was greater than 2.4 meq/g as in Comparative Example 2, it was identified that salt rejection and permeate flow significantly decreased.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. A water treatment membrane comprising:
a support; and
a polymer layer on the support, the polymer layer including a copolymer containing a hydrophobic repeating unit and a hydrophilic repeating unit including an ion exchange functional group,
wherein:
the polymer layer has ion exchange capacity (IEC) of 0.02 meq/g to 2.4 meq/g;
the hydrophilic repeating unit has the following Chemical Formula 3:

[Chemical Formula 3]

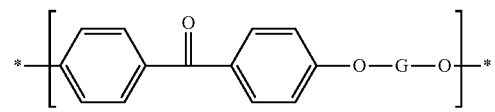

wherein:
G in each repeating unit is a functional group selected from the group consisting of:

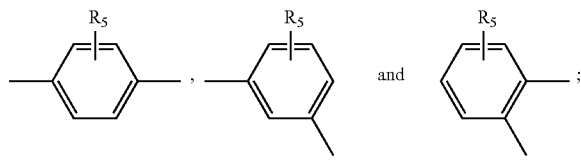

$R_5$ has an ion exchange functional group that is —$SO_3M$, —$CO_3M$ or —$PO_3M$ where M is H, Na or K; and
the hydrophobic repeating unit has the following Chemical Formula 4:

[Chemical Formula 4]

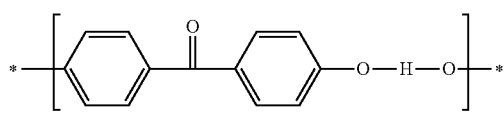

wherein:
H in each repeating unit is a functional group selected from the group consisting of:

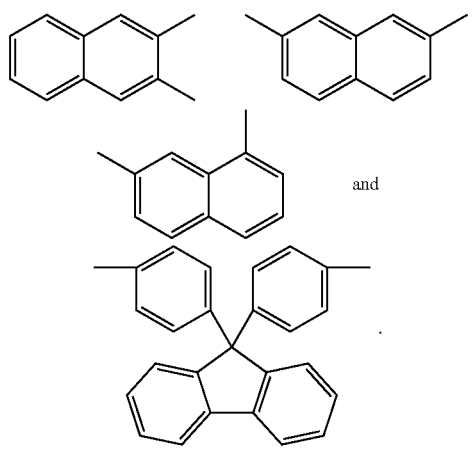

and
* in Chemical Formula 3 and 4 is a site at which repeating units are connected and no separate atoms or molecules are present at the site.

2. The water treatment membrane of claim 1, wherein a molar ratio of the hydrophilic repeating unit and the hydrophobic repeating unit is 1:9 to 1:1.

3. The water treatment membrane of claim 1, wherein the copolymer has a weight average molecular weight of 30,000 to 1,000,000.

4. The water treatment membrane of claim 1, wherein the polymer layer has a thickness of 0.1 μm to 200 μm.

5. The water treatment membrane of claim 1, which has initial salt rejection of 97% or greater, and initial permeate flow of 38 to 48 gallon/ft²·day when a sodium chloride (NaCl) solution having a concentration of 32,000 ppm passes therethrough under a pressure of 800 psi.

6. The water treatment membrane of claim 1 comprising one or more active layers on the polymer layer.

7. The water treatment membrane of claim 1, which is a microfiltration membrane, an ultrafiltration membrane, a nanofiltration membrane or a reverse osmosis membrane.

8. A water treatment module comprising the water treatment membrane of claim 1.

9. A method for manufacturing a water treatment membrane comprising:
coating a support using a solution including a copolymer containing a hydrophobic repeating unit and a hydrophilic repeating unit including an ion exchange functional group, and a solvent; and
carrying out phase transition by immersing the coated support in a non-solvent,
wherein:
the copolymer is a copolymer containing a hydrophobic repeating unit and a hydrophilic repeating unit including an ion exchange functional group,

[Chemical Formula 3]

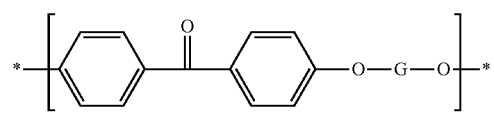

wherein:
G is any one or more functional groups selected from the group consisting of the following functional groups:

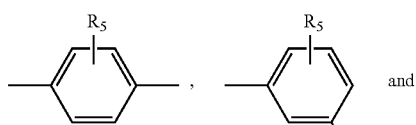

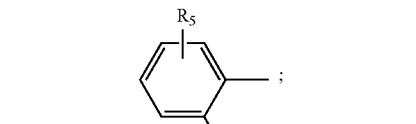

$R_5$ has an ion exchange functional group that is —$SO_3M$, —$CO_3M$ or —$PO_3M$ where M is H, Na or K; and
the hydrophobic repeating unit has the following Chemical Formula 4:

[Chemical Formula 3]

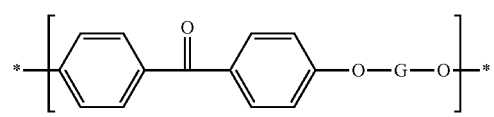

wherein:
H is any one or more functional groups selected from the group consisting of the following functional groups:

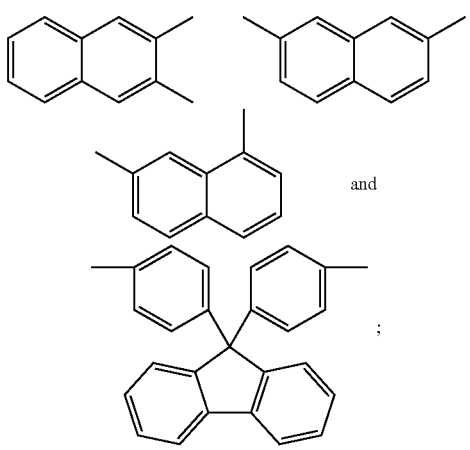

and

* in Chemical Formula 3 and 4 is a site at which repeating units are connected and no separate atoms or molecules are present at the site.

10. The method for manufacturing a water treatment membrane of claim 9, wherein the non-solvent is selected from the group consisting of distilled water that is distilled once, distilled water that is distilled three times, alcohols, and a mixture thereof.

11. The water treatment membrane of claim 1, wherein: the hydrophilic repeating unit is:

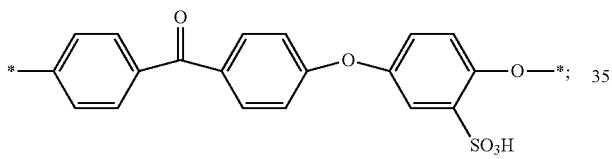

and
the hydrophobic repeating unit is:

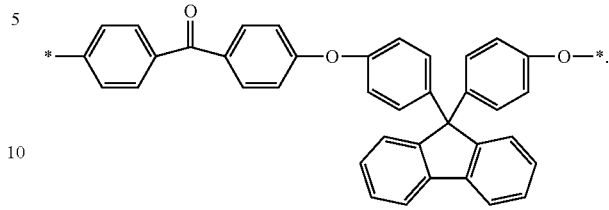

12. The method for manufacturing a water treatment membrane of claim 9, wherein:
the hydrophilic repeating unit is:

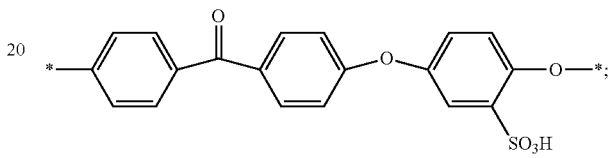

and
the hydrophobic repeating unit is:

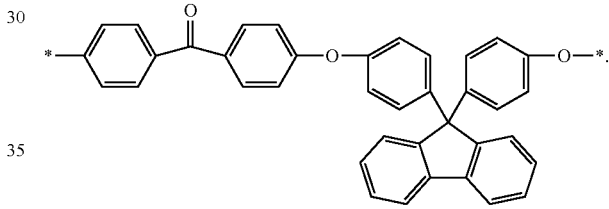

* * * * *